United States Patent
Stucki

(10) Patent No.: US 8,294,613 B2
(45) Date of Patent: Oct. 23, 2012

(54) ANTENNA COMBINATION FOR A MOBILE GNSS STATION AND MOBILE GNSS STATION

(75) Inventor: Silvan Stucki, St. Gallen (CH)

(73) Assignee: Leica Geosystems AG, Heerbrugg (CH)

( * ) Notice: Subject to any disclaimer, the term of this patent is extended or adjusted under 35 U.S.C. 154(b) by 317 days.

(21) Appl. No.: 12/600,521

(22) PCT Filed: Jun. 4, 2008

(86) PCT No.: PCT/EP2008/004437
§ 371 (c)(1),
(2), (4) Date: Mar. 24, 2010

(87) PCT Pub. No.: WO2008/148530
PCT Pub. Date: Dec. 11, 2008

(65) Prior Publication Data
US 2010/0214168 A1 Aug. 26, 2010

(30) Foreign Application Priority Data
Jun. 4, 2007 (EP) .................................... 07109540

(51) Int. Cl.
*G01S 19/25* (2010.01)
*G01S 19/36* (2010.01)
*H01Q 21/28* (2006.01)

(52) U.S. Cl. ............... 342/357.64; 342/357.76; 343/726

(58) Field of Classification Search ............ 342/357.26, 342/357, 42, 357.64, 357.34
See application file for complete search history.

(56) References Cited

U.S. PATENT DOCUMENTS 5,523,761 A * 6/1996 Gildea ..................... 342/357.31
5,644,318 A * 7/1997 Janky et al. ............... 342/357.31

(Continued)

FOREIGN PATENT DOCUMENTS

| EP | 0999608 A1 | 5/2000 |
| FR | 2689688 A1 | 10/1993 |
| WO | 01/33666 A1 | 5/2001 |

OTHER PUBLICATIONS

Leica GPS1200 Series High Performance GNSS System, Leica Geosystems Publication, 2006, pp. 1-7.*

(Continued)

*Primary Examiner* — Gregory C Issing
(74) *Attorney, Agent, or Firm* — Maschoff Gilmore & Israelsen

(57) ABSTRACT

The invention relates to a mobile geodetic GNSS measuring station (1) for use in a relative satellite-supported positioning system (Global Navigation Satellite System—GNSS) for performing precise measurement tasks. The GNSS measuring station (1) has a housing (10) in which at least one planar, particularly circular disc-shaped GNSS antenna (20) for receiving circularly polarized GNSS satellite signals, a GNSS satellite receiver disposed below the GNSS antenna and having a signal connection to the GNSS antenna (20) and a first broadband radio antenna (30) for receiving and/or transmitting radio signal waves having GNSS correction information in a first frequency band in the frequency range of 400 MHz to 470 MHz are integrated. According to the invention, the first radio antenna (30) is disposed substantially at the height of the GNSS antenna (20) and at least partially encompasses the GNSS antenna (20) in the circumferential direction. A second radio antenna (40) is further disposed in the housing below the GNSS antenna (20) at a distance therefrom, the second radio antenna (40) being designed as a multiband antenna for omnidirectionally receiving and/or transmitting radio signal waves in frequency bands of 850 MHz, 900 MHz, 1800 MHz, and/or 1900 MHz.

23 Claims, 4 Drawing Sheets

U.S. PATENT DOCUMENTS

| | | | |
|---|---|---|---|
| 5,691,726 A | | 11/1997 | Nichols et al. |
| 5,831,577 A | * | 11/1998 | Nichols et al. ........... 342/357.31 |
| 5,917,454 A | * | 6/1999 | Hill et al. ...................... 343/769 |
| 5,918,183 A | | 6/1999 | Janky et al. |
| 6,023,245 A | * | 2/2000 | Gomez et al. ................. 343/725 |
| 6,091,358 A | * | 7/2000 | Maniscalco et al. ..... 342/357.57 |
| 6,683,570 B2 | * | 1/2004 | Skladany et al. ...... 343/700 MS |
| 6,751,467 B1 | | 6/2004 | Cameron et al. |
| 7,062,305 B1 | | 6/2006 | Cameron et al. |
| 7,110,762 B1 | | 9/2006 | Cameron et al. |
| 2003/0201939 A1 | | 10/2003 | Reece et al. |
| 2006/0127096 A1 | * | 6/2006 | Nichols ......................... 398/115 |

OTHER PUBLICATIONS

Trimble GPS Total Station 4800 A NewEra of Dual Frequency GPS Surveying, Trimble Navigation Publication, 1997. pages 1-7.*

Trimble 4800 Specifications, Trimble Navigation Product Data Sheet, 1997-2001, 1 page.*

Mohammed Bashir et al "Flache Kombi-antenne Fur GSM and GPS" Funkschau, Weka Fachzeitschriften Verlag, Poing, DE, vol. 67, No. 2, Jan. 5, 1995, pp. 60-62, XP000495360.

* cited by examiner

ANTENNA COMBINATION FOR A MOBILE GNSS STATION AND MOBILE GNSS STATION

The invention relates to an antenna combination for a mobile GNSS station and to a mobile GNSS station for use in a relative satellite-supported positioning system for carrying out precise surveying work.

BACKGROUND

Global Navigation Satellite System (GNSS) is a general term for all modern satellite-supported positioning systems. Currently in operation are the GLONASS, which is operated by the Russian Ministry of Defence, and the Global Positioning System (GPS), which is operated by the US Department of Defence. The Galileo system is also being established. The invention described below can be used in any of these satellite-supported positioning systems. The first system to be developed was the GPS, which is currently the most frequently used one. The system comprises a nominal configuration of 24 satellites with sufficient redundancy so that typically visual contact with about six satellites exists at any time and from any location. For determining the three-dimensional position of a user, it is necessary to receive at least four satellite signals. The accuracy of positioning is limited to about 10 m.

A relative GNSS is a technique for increasing the achievable accuracy of positioning to a submeter range. For this purpose, a GNSS receiver is set up at a location having a known three-dimensional position, the GNSS receiver thus acting as a reference station. By comparison of the position determined by means of the GNSS signals with the known position, influences having an adverse affect on the accuracy of positioning, such as, for example, refraction or orbital errors, can be substantially reduced.

The calculated correction data can now be sent by means of an additional radio connection to one or more user stations in order to permit correspondingly accurate positioning of the user stations.

There are two possibilities for relative GNSS positioning: differential GNSS positioning (DGNSS) and real time kinematic positioning (RTK). In the case of RTK positioning, a higher data flow of correction data is necessary, it also being possible to achieve a higher accuracy of positioning. Thus, in DGNSS positioning, an accuracy in the meter range is possible, whereas an accuracy in the centimetre range can be achieved in RTK positioning.

An example of relative GNSS positioning for surveying work is shown in FIG. 1. A GNSS receiver 103 of a reference station 101 receives position signals 104 from satellites via a GNSS antenna 102. In addition, the exact fixed position of the reference station 101 is known. The position signals 104 are processed to give correction data 105. Correction data or correction information 105 means in this context positions, status information, satellite measurement data and/or measurement correction data, etc. Such correction data can be provided, for example, in standardized data formats, such as CMR, CMR+, RTCM 2.x, RTCM 3.x. The correction data 105 are transmitted by means of a radio device 106 in a certain frequency band via the radio antenna 107.

A user station 111 receives the GNSS correction data 105 by means of a radio device 116 via the radio antenna 117 and passes on said correction data to the GNSS receiver 113 of the user station 111. At the same time, the GNSS receiver 113 of the user station receives GNSS position signals 114 via a GNSS antenna 112. By means of the correction data 105, a correction of the position of the user station 111 determined by the GNSS position signals, is possible.

Modern GNSS stations can act both as a user station and, in the case of known positioning, as a reference station.

Since a standardized data format is used for the GNSS correction data, it is possible to combine equipment from different suppliers. However, the radio frequencies at which the waves carrying the GNSS correction data are transmitted and received are not standardized.

In choosing suitable radio frequencies or communication services for the GNSS data transmission, technical, economic and administrative aspects play a role.

In general, the following is true: the lower the frequency, the greater is the possible distance between the transmitter of the correction data and the receiver. At the same time, however, the following is also true: the higher the frequency, the higher is the possible data transmission rate.

Radio frequencies are, however, not freely useable. The use is regulated by international agreements and national laws.

For example, frequencies in the lower microwave range, on which it is possible to operate without permission at low power, are available in large parts of Europe. The range of the transmitter is limited to a few kilometres.

GNSS corrections are broadcast over an extensive area in many countries as part of the data transmission operated by broadcasters with the aid of the Radio Data System (RDS).

Mobile telephone frequencies and internet services are also frequently used for the transmission of correction information.

In order to permit a high degree of combinability with different systems by coverage of different frequencies for correction data transmission in the case of GNSS receiver stations, known GNSS stations 101, as shown in FIG. 1, are formed, for example, with a holder for a radio module 106, the radio module 106 containing both a radio modem and a downward-pointing rod antenna 107 and being connected by the plug connection to the GNSS receiver 103. Depending on the frequency used in the system in which the GNSS station 101 is employed, the corresponding radio module 106 can be employed in the GNSS station 101 for communication of GNSS correction data 105. The radio module 106 then receives correction data 105 which are transmitted to the GNSS receiver 103 and are used for correction of the measured position. However, in the case of a rod antenna 107 arranged next to the surveyor's staff 108, the fact that it may be destroyed on the ground by environmental influences and/or mechanical damage, does not have an optimal radiation characteristic—in particular owing to signal wave obscurations by the plumbing staff or by a user holding the plumbing staff 108—and covers a relatively small frequency range proves to be disadvantageous. Alternatively, integration of the radio antenna in the surveyor's pole is also known, but the potential uses of the surveying station are limited thereby to the application on the surveyor's pole. On the other hand, potential uses of the GNSS surveying station on a total station, a tripod or a support would also be desirable.

A further GNSS receiver station known in the prior art is realized with a rod antenna which is arranged outside the housing, pointing upwards and centrally on the GNSS station. However, it is not possible to rule out the fact that the GNSS signals received by the GNSS antenna located underneath and hence the GNSS accuracy will be influenced thereby. Furthermore, during use on the ground, this solution is also susceptible to damage and awkward since care is always required.

U.S. Pat. No. 6,751,467 and U.S. Pat. No. 7,110,762 describe, as prior art, a GPS receiver in a housing in which a radio modem receiver, below the GPS receiver, and a radio antenna are additionally integrated. The radio antenna geometry in the form of a slot antenna is mounted on a polyimide sheet. The sheet with the antenna geometry is rolled into a cylinder and arranged below the GPS antenna, around the radio modem receiver, in the housing of the GPS receiver. However, the radiation characteristic of the antenna arrangement described has a strong directional dependency; furthermore, this antenna arrangement covers a relatively small frequency range and has a large space requirement.

U.S. Pat. No. 5,831,577 and U.S. Pat. No. 5,691,726 disclose an antenna combination comprising a GNSS antenna which has an upward-pointing, radiating circuit board and a motherboard underneath, and a wire loop antenna which is arranged as a winding below or above the GNSS antenna and is formed for receiving radio signals with correction information. In the case of the arrangement of the wire loop radio antenna above the GNSS antenna, however, it is not possible to rule out an influence on the GNSS signals received by the GNSS antenna underneath and hence on the GNSS accuracy. In the case of the arrangement below the GNSS antenna, the radiation characteristic of the wound radio antenna is influenced by the GNSS antenna. Also disadvantageous is the poor compatibility with further systems, since only a small frequency range is covered by the wire loop radio antenna and it is therefore possible to communicate via radio only with devices tuned thereto. Thus, it is usual for some providers to have to equip their GNSS receiver units for different areas of use (Europe, USA) and for use in different systems, each with antenna geometries specialized appropriately therefor.

In summary, negative mutual influences on the antennas arranged in the housing occur in the case of solutions to date for GNSS receivers; further solutions are susceptible to destruction and are not easy to handle during use on the ground (for example breakage of an externally arranged antenna), are not compact or have poor compatibility for communication of correction data with further units.

SUMMARY

It is therefore an object of the invention to provide a GNSS surveying station which has little susceptibility to destruction, is compact and/or easy to handle during use on the ground and has high compatibility for communication of correction data.

The antennas used for receiving GNSS satellite signals and GNSS correction data should show little mutual disturbance or influence. In particular, an omnidirectional radiation characteristic of the radio antennas provided for reception and emission of the GNSS correction data should furthermore be achieved and no troublesome obscurations should be caused by a user.

An antenna combination according to the invention for geodetic GNSS receiver station has a planar, in particular circular disc-shaped GNSS antenna and at least one first radio antenna which is arranged in a circumferential direction at least partly substantially at the height of the GNSS antenna and around the latter and thus encompasses the circumference of the GNSS antenna at least partly, in particular substantially completely. In particular, the first radio antenna and the GNSS antenna are arranged concentrically. The first radio antenna is in the form of a broadband antenna and has a first antenna geometry with which electromagnetic waves can be omnidirectionally received and emitted in a frequency band in the range from 400 MHz to 470 MHz and thus covers at least a frequency band in the frequency range from 400 MHz to 470 MHz—in particular the total frequency band from 400 MHz to 470 MHz.

The antenna combination comprising the GNSS antenna, the first radio antenna and the second radio antenna is completely integrated, together with further components, in a housing of the GNSS station, which housing is in particular mushroom-shaped and consists, for example, of plastic.

The first antenna geometry is composed, for example, of conductive strips which are mounted on a nonconductive carrier material. For example, a copper tape in the form of a monopole or dipole antenna can be mounted on a plastic tape as a very simple embodiment. The antenna geometry is determined by the frequency band for which the antenna is to be designed and can be appropriately designed by the person skilled in the art. A nonconductive material, such as, for example, polyimide sheet material, should advantageously be used as carrier material. Also conceivable is the mounting of the conductor strips of the first antenna geometry directly on a filler material, which has the housing of the GNSS station, in order to embed the GNSS antenna. Further possible embodiments are mounting of the strips directly on the housing wall at the height of the GNSS antenna so that the first antenna geometry encompasses the GNSS antenna.

As a further embodiment, the first radio antenna may also be in the form of a wire loop antenna which is wound in the circumferential direction around a filler material embedding the GNSS antenna.

By arranging the first radio antenna around the GNSS antenna and substantially at the height of the GNSS antenna, the GNSS signals received by the GNSS antenna and hence the accuracy of positioning are not influenced by the first radio antenna. This arrangement of the first radio antenna also permits an omnidirectional radiation characteristic. These effects can be achieved by the arrangement of the first radio antenna exactly at the height of the GNSS antenna —or in such a way that the first radio antenna overlaps the circumference of the GNSS antenna—but also in the case of an arrangement of the first radio antenna about 1 cm above or about 2 or 3 cm below the GNSS antenna. The GNSS antenna and the first radio antenna arranged around it in the circumferential direction are advantageously arranged at the very top in the housing, with the result that obscuration by a user and/or by a surveyor's pole or pillar on which the GNSS surveying station may be fixed is prevented.

In addition to the first radio antenna, the antenna combination has a second radio antenna which is arranged below the GNSS antenna. The second, preferably planar radio antenna is aligned, for example, parallel to the GNSS antenna and is in particular at least 5 cm away from the GNSS antenna. The second radio antenna with a second antenna geometry is preferably a multiband antenna which covers a plurality of frequency bands which differ from the frequency band of the first radio antenna. In particular, the second radio antenna covers a plurality or especially all of the GSM/UMTS frequency bands (850 MHz, 900 MHz, 1800 MHz, 1900 MHz, 2100 MHz). The formation of the second antenna geometry in which the WLAN frequency band (2400 MHz) and the US radio solution frequency band (915 MHz) are additionally covered is likewise possible. Such antenna geometries are known to the person skilled in the art, for example as so-called GSM quad-band antennas, and, depending on requirements with regard to the GNSS receiver unit, can be appropriately chosen and designed so that the required frequency bands are covered.

According to the invention, the GNSS station is therefore equipped by the antenna combination integrated in the housing for correction data communication in all frequency bands customary for this purpose, with the result that a high degree of combinability with devices of other systems and a use of the GNSS station in many different areas of the world are permitted—in spite of the fact that GNSS correction data are communicated in each case on different frequency bands depending on the area.

Furthermore, the GNSS receiver station may have a GNSS satellite receiver—which is arranged in particular directly below the GNSS antenna in the optionally mushroom-shaped housing—and a first and second battery compartment and a holder for a radio module.

Signal interfaces for the first and for the second radio antenna and for the GNSS satellite receiver are provided on the holder of the radio module. As is known from the prior art, a desired or suitable radio module which is designed for certain frequency bands can, if required, be connected to the GNSS station. By the interfaces of the radio module holder, the connected radio module is connected to the GNSS satellite receiver and, depending on frequency bands supported, either to the first or to the second radio antenna. The respective radio modules can therefore be formed without antennas since they use the radio antennas integrated in the housing of the GNSS station.

The GNSS station according to the invention, comprising the integrated multi-antenna combination, can be formed in particular as a reference station or in particular as a user station and alternatively also as a combined reference and user station. By the integration, according to the invention, of the antenna combination in the housing of the GNSS station, with the result that this is equipped for all frequency bands usually used for GNSS correction data transmission—a high degree of compactness of the GNSS station and high compatibility with equipment of further GNSS systems are achieved. By arranging the radio antennas well towards the top in the GNSS station, it is furthermore possible to achieve an omnidirectional radiation characteristic of the radio antennas and to dispense with further, external antennas which are mounted in each case on the individual radio modules, pointing downwards. Undesired obscurations by the user or the surveying staff on which the GNSS station is mounted are thus reduced. Moreover, the GNSS station is less susceptible to destruction during use on the ground, owing to the possible compact and robust design, and can be well protected from environmental influences by a water-tight housing in which all components are integrated in a compact manner.

BRIEF DESCRIPTION OF THE DRAWINGS

The method according to the invention and the device according to the invention are described in more detail below, purely by way of example, with reference to specific working examples shown schematically in the drawings, further advantages of the invention also being discussed. Specifically.

DETAILED DESCRIPTION

Figure 1:
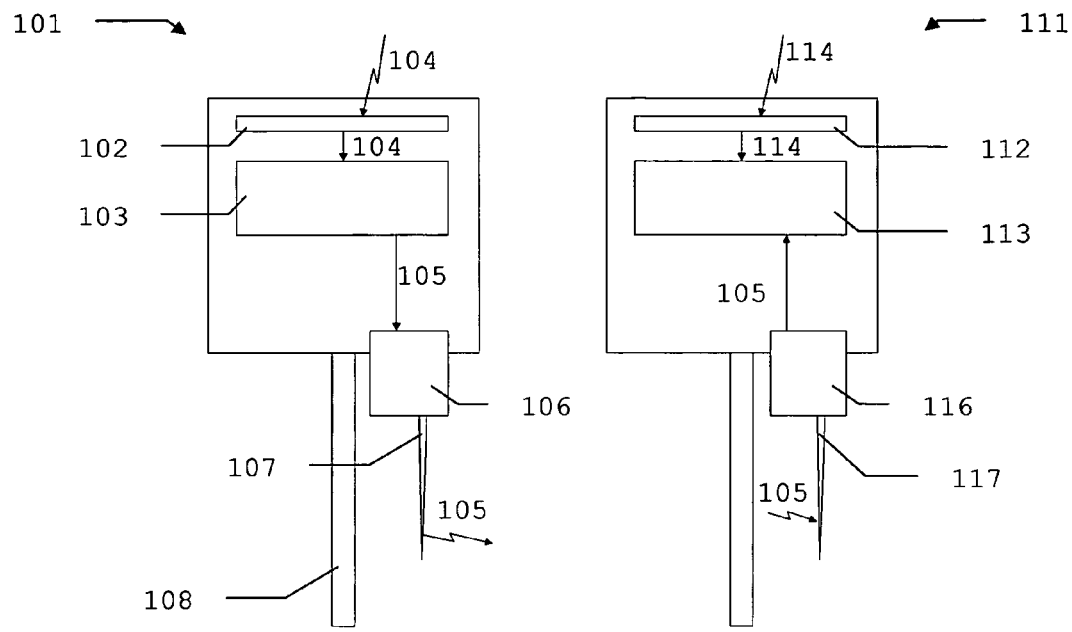
FIG. 1 shows a data flow in the case of relative GNSS positioning with GNSS stations of the prior art.

FIG. 1 illustrates the data flow discussed at the outset, in the case of relative GNSS positioning with GNSS stations of the prior art.

Figure 2:
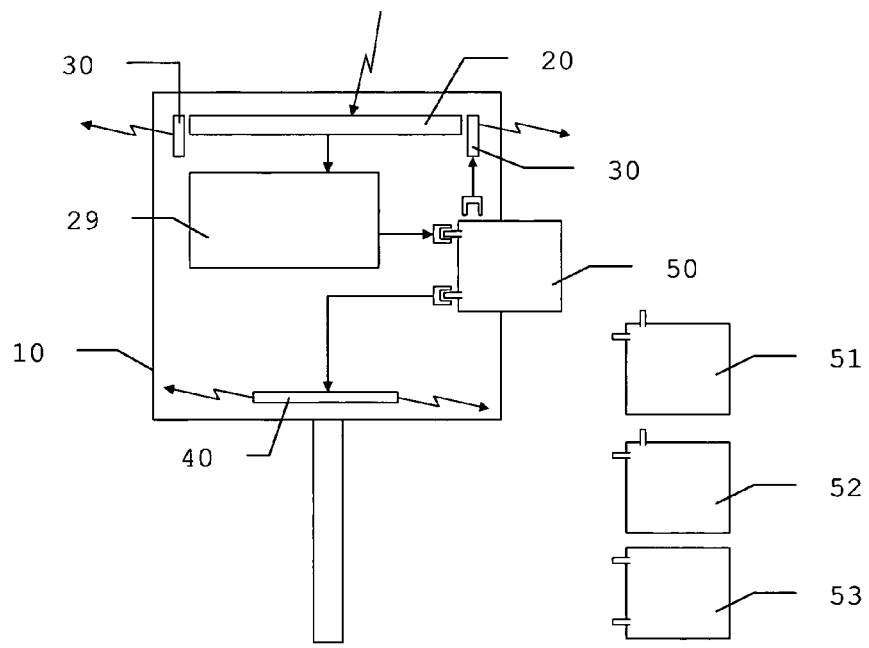
FIG. 2 shows a schematic diagram of a GNSS station according to the invention.

FIG. 2 shows a schematic setup of a GNSS station 1 according to the invention, comprising a housing 10, a GNSS satellite receiver 29 and a modular radio system and comprising an antenna combination according to the invention which is integrated in the housing 10 of the GNSS station 1. The antenna combination consists of a GNSS antenna 20, a first radio antenna 30 and a second radio antenna 40. The first radio antenna 30, which is mounted around the GNSS antenna 20, is formed as a broadband antenna for receiving and transmitting signals in a frequency band of 400 MHz to 470 MHz. The second, substantially planar radio antenna 40 is in the form of a multiband antenna and has a second antenna geometry for receiving and transmitting signals in the frequency bands 850 MHz, 900 MHz, 1800 MHz, 1900 MHz, 2100 MHz and 2400 MHz. Consequently, all customary frequency bands in which radio communication takes place are covered. Since a standardized data format is used for communication of GNSS correction data, the GNSS station according to the invention is therefore prepared for use with a very wide range of systems.

For the connection of a radio module 50, 51, 52, 53 suitable for a desired frequency band, the housing has a radio module holder with interfaces to the GNSS satellite receiver 20 and to the first and second radio antennas 30, 40. The connectable radio modules 50, 51, 52, 53—which in each case are formed for receiving and/or emitting GNSS correction data and for transmitting the GNSS correction data to the GNSS satellite receiver 29—are each designed for a certain frequency band and require no separate antenna but have, for example, switchable signal connections to the GNSS satellite receiver and, depending on the frequency band supported, to the first and to the second radio antenna 30, 40.

According to the invention, inter alia, the disadvantage that in each case external, downward-pointing rod antennas have to be arranged on the individual radio modules and hence there is a danger of obscuration by the surveyor's pole or the user can be eliminated thereby.

Likewise, a disturbance of the GNSS signal to be received by the GNSS antenna is prevented by virtue of the fact that, according to the invention, no upward-pointing radio antenna arranged on the housing is present.

Furthermore, the GNSS surveying station 1 has an arithmetic unit integrated in the housing 10 and intended for deriving high-precision position information or GNSS position from the GNSS satellite signals and GNSS correction data received, it being possible in particular for the arithmetic unit to be integrated in the GNSS satellite receiver 29. Furthermore, the arithmetic unit itself may also be formed for deriving the GNSS correction data, for which purpose received GNSS satellite signals and known positioning or a position of the surveying station 1 determined in another manner or known can be used.

Figure 3:
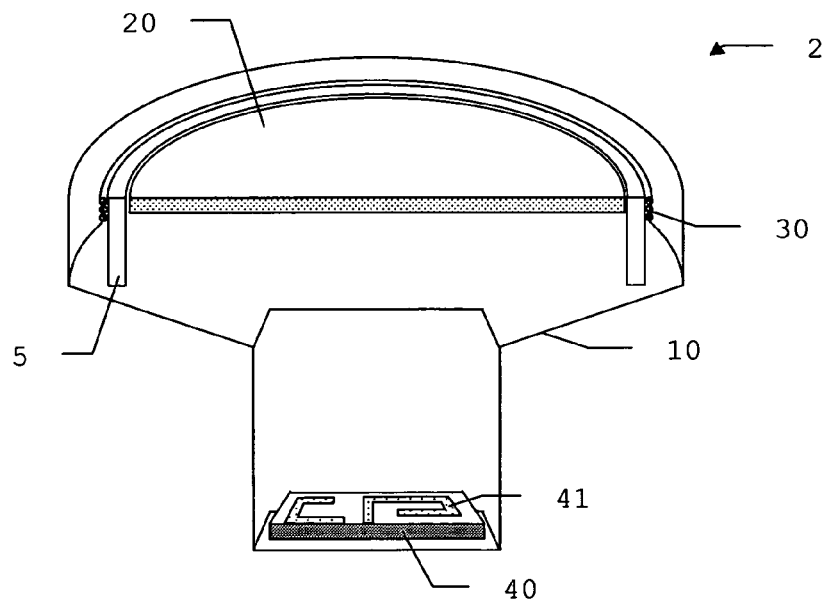
FIG. 3 shows a section of an antenna combination according to the invention, with a first radio antenna arranged around a GNSS antenna, in a first embodiment.

FIG. 3 shows an antenna combination 2 according to the invention for a mobile GNSS station. The antenna combination 2 consists of a GNSS antenna 20, a first radio antenna 30 and a second radio antenna 40, all of which are integrated in a single housing 10 which may also act as a GNSS station housing. The GNSS antenna 20 and the first radio antenna 30 are arranged at the top in the housing 10, substantially at the same height, and the second radio antenna 40 is arranged at the bottom in the housing 10.

The GNSS antenna 20 is, as is known according to the prior art, in the form of a planar, disc-shaped circuit board and permits reception of circularly polarized GNSS satellite signal waves. In particular, the planar GNSS antenna 20 is arranged in the housing with horizontal alignment. An insulating filler material 5 which is in the form of a hollow cylinder and embeds the GNSS antenna 20 is mounted around the GNSS antenna 20 in the circumferential direction. The first radio antenna 30 in the form of a wire loop antenna is wound around the filler material 5 in such a way that it encompasses the GNSS antenna 20 in the circumferential direction, is at most 3 cm, in particular at most 2 cm, away radially from the circumference of the GNSS antenna 20 and is designed for the broad frequency band from 400 MHz to 470 MHz.

The second radio antenna 40 having a second antenna geometry 41 is arranged parallel to and below the GNSS antenna 20 and at least 5 cm away therefrom. It is formed as a multiband antenna for omnidirectional reception and/or emission of radio signal waves in the frequency bands of 850 MHz, 900 MHz, 1800 MHz and/or 1900 MHz. The second antenna geometry 41 can, as is known according to the prior art, be designed by a person skilled in the art according to frequency bands to be covered—for example as a quad-band antenna.

Figure 4:
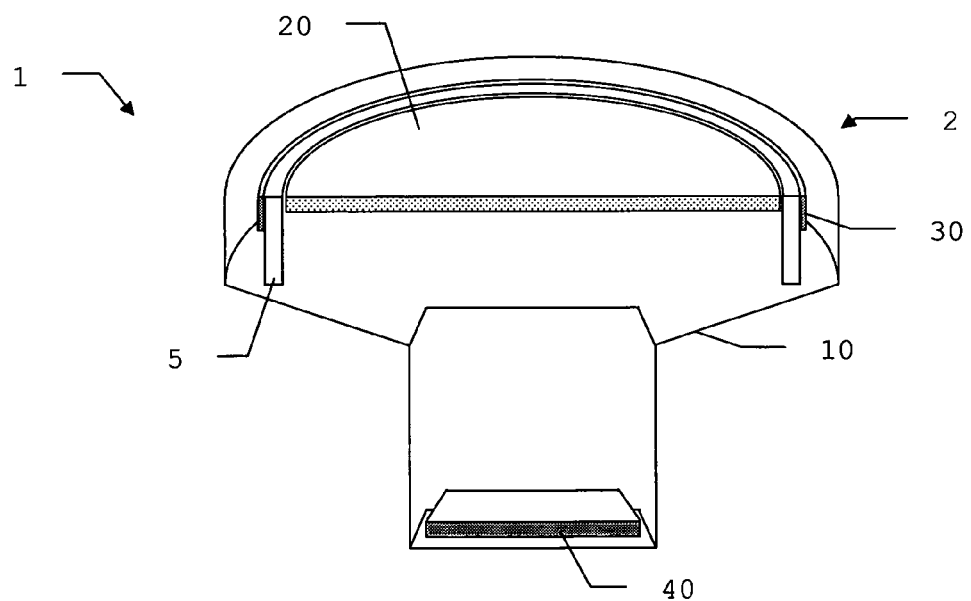
FIG. 4 shows a section of an antenna combination according to the invention, with a first radio antenna arranged around a GNSS antenna, in a second embodiment.

FIG. 4 shows a further embodiment of an antenna combination 2 according to the invention. In contrast to the antenna combination shown in FIG. 3, the first radio antenna 30 now has two-dimensional antenna geometry comprising copper strips which are mounted on a nonconductive carrier material. The carrier material consists in particular of polyimide tape on both sides of which copper strips can be applied by vapour deposition. The polyimide tape with the antenna geometry applied thereon is now arranged in the circumferential direction around the GNSS antenna 20 so that it substantially encompasses the circumference of the GNSS antenna. The arrangement of the copper strips on the polyimide tape can, as is known according to the prior art, be designed by a person skilled in the art according to frequency bands to be covered.

Alternatively, the antenna geometry comprising conductive strips could also be applied directly to the filler material 5 which encompasses the GNSS antenna 20 in the circumferential direction or directly to the housing wall at the height of the GNSS antenna 20, so that this is encompassed by the first antenna geometry in the circumferential direction.

Figure 5:
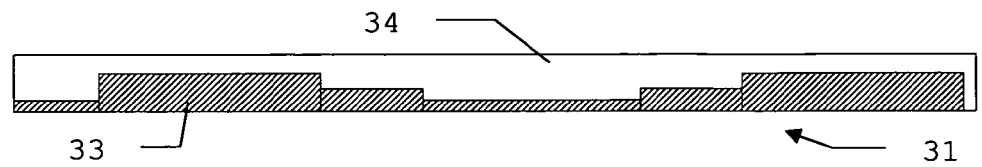
FIG. 5 shows an antenna geometry with a dipole arrangement on a carrier tape as a first radio antenna, in a laid-out state.
Figure 6:
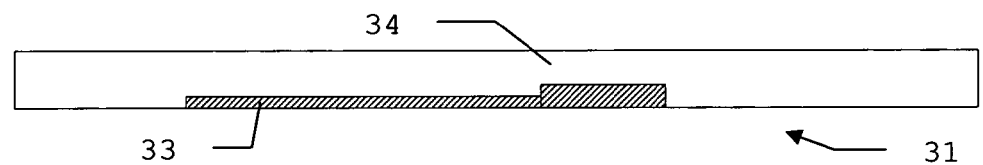
FIG. 6 shows an antenna geometry with a monopole arrangement on a carrier tape as a first radio antenna, in a laid-out state.
Figure 7:
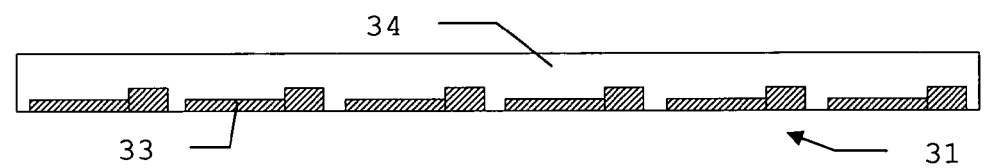
FIG. 7 shows an antenna geometry with a plurality of monopole arrangements on a carrier tape as a first radio antenna, in a laid-out state.

FIGS. 5 to 7 show embodiments of the first radio antenna 30 with different two-dimensional antenna geometries 31, for example comprising copper strips 33 on a polyimide tape 34, in the laid-out, non-curved state. In FIG. 5, an antenna geometry 31 is formed as a dipole antenna which is applied to one side of the polyimide tape. The length of the dipole antenna is, for example, about 37.5 cm, so that it is designed approximately for a frequency band of 400 MHz. In the case of a customary circumference of the GNSS antenna, a first radio antenna formed in this manner may be arranged almost completely in the circumferential direction around the GNSS antenna, with the result that the first radio antenna then has an omnidirectional radiation characteristic.

An antenna geometry 31 as shown in FIG. 6 can also be applied to the polyimide tape. Depending on the chosen length, the arrangement in the form of a monopole antenna is then designed for a corresponding frequency band, as known to the person skilled in the art. As shown in FIG. 7, a plurality of such antenna arrangements can also be applied to a tape in succession as antenna geometry 31, so that the antenna in the state wound around the GNSS antenna has an omnidirectional radiation characteristic.

If, for example, two monopole antennas which have a length of about 33 cm are applied to the back of the polyimide tape shown in FIG. 5, the first radio antenna is in the form of a broadband antenna, for a frequency band from 400 MHz to 470 MHz.

Figure 8:
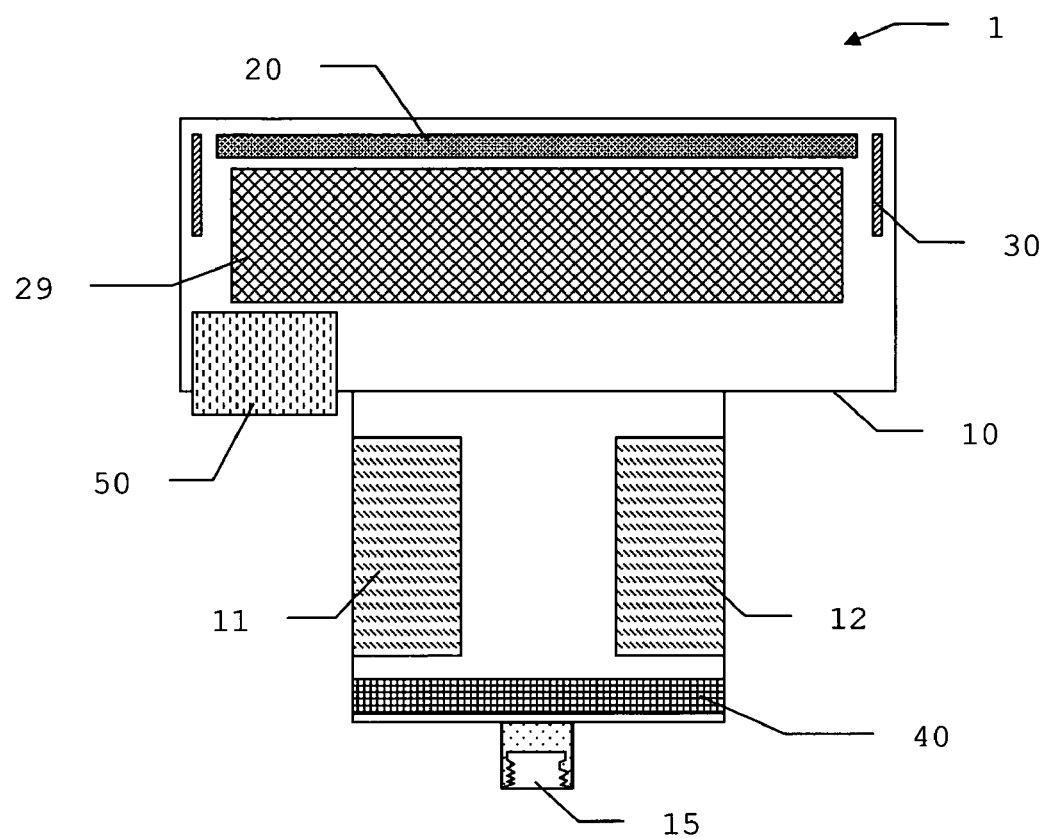
FIG. 8 shows a cross-section of a GNSS station according to the invention.

FIG. 8 shows a mobile GNSS station 1 according to the invention for use in a relative GNSS for carrying out precise surveying work, comprising a single housing 10 in which two battery compartments 11, 12, an antenna combination as shown in FIG. 4 and a GNSS satellite receiver 29 are integrated. In addition, the GNSS station 1 has, on the housing 10, a holder for a connectable radio module 50 with interfaces to the first and to the second radio antenna 30, 40 and for the GNSS satellite receiver 29. Present in the holder is a connected radio module 50 for transmitting or receiving GNSS correction data, which is connected via the interfaces to the GNSS satellite receiver 29 and to one of the two radio antennas 30, 40.

The housing 10 is mushroom-shaped, the GNSS antenna 20 and the first radio antenna 30 being arranged concentrically and at the top in the housing 10. The GNSS satellite receiver 29 which has a connection to the GNSS antenna 20 is provided directly below the GNSS antenna 20. In the lower region of the housing 10—below the GNSS antenna 20, below the GNSS satellite receiver 29 and below the battery compartments 11, 12—the second radio antenna 40 is arranged with a parallel alignment to the GNSS antenna 20.

The two battery compartments 11, 12, which in each case are formed for holding an energy store, in particular battery or accumulator, are arranged opposite one another on the stem of the mushroom-shaped housing 10, so that the heavy batteries do not result in a nonuniform mass distribution. The supply circuits of the two batteries 11, 12 and the further electrics and electronics of the GNSS station are configured in such a way that the GNSS station can be operated either with an energy store used only in the first battery compartment or with an energy store used only in the second battery compartment, with the result that, for example, changing of a battery is possible without interruption of operation.

By the integration, according to the invention, of the first and of the second radio antenna 30, 40, a very compact arrangement of the components in a single housing 10 without projecting antennas or cable connections, which are very susceptible to destruction during use on the ground, can be realized. By covering all customary radio frequency bands, which can be realized according to the invention, by means of the integrated radio antennas 30, 40, high compatibility with equipment of other systems and also a possibility of using the GNSS station 1 in countries where only specific frequency bands are freely useable is furthermore achieved. Since, according to the invention, the first radio antenna 30 is arranged very high in the housing, but without influencing the GNSS signals which can be received by the GNSS antenna 20, an omnidirectional radiation characteristic is possible. In addition, obscurations by the user are avoided thereby.

In particular, the GNSS surveying station 1 additionally has a surveyor's pole which is formed for detachable fastening to the housing and has a length of at least about 1.50 m, in particular at least about 2 m, or can be extended to at least this length. Owing to the provided length of the surveyor's pole of at least two metres, it is additionally possible to ensure that both the first and the second radio antenna—both of which are integrated, according to the invention, in the housing 10 of the GNSS surveying station 1 fastened to the surveyor's pole—are not obscured by the user.

For fastening the GNSS surveying station 1 to the surveyor's pole, it is possible to provide for this purpose, on the housing 10, a downward-pointing surveyor's pole holder 15 which moreover can act as a facility for detachable fastening of the GNSS surveying station 1 to a tripod, a pillar or a total station.

Of course, these figures shown represent only examples of possible embodiments.

I claim:

1. A mobile geodetic global navigation satellite system (GNSS) surveying station for use in a relative satellite-supported positioning system for carrying out precise surveying work, comprising:
    a housing in which are integrated at least:
        a planar GNSS antenna for receiving circularly polarized GNSS satellite signals;
        a GNSS satellite receiver arranged below the GNSS antenna and having a signal connection to the GNSS antenna;
        a first broadband radio antenna for receiving and/or emitting radio signal waves with GNSS correction information in a first frequency band in the frequency range from 400 MHz to 470 MHz; and
        a second radio antenna arranged in the housing below the GNSS antenna and a distance away therefrom, the second radio antenna including a multiband antenna for omnidirectional reception and/or emission of radio signal waves in frequency bands of 850 MHz, 900 MHz, 1800 MHz and/or 1900 MHz, wherein:
            the first radio antenna is arranged substantially at the height of the GNSS antenna and at least partly encompasses the GNSS antenna in the circumferential direction; and
            the first radio antenna has two-dimensional antenna geometry comprising copper strips which are mounted around a nonconductive carrier material, the carrier material consisting of polyimide tape on both sides of which copper strips are applied by vapour deposition and arranged in the circumferential direction around the GNSS antenna.

2. A GNSS surveying station according to claim 1, wherein the second radio antenna is a substantially planar antenna and is arranged parallel to the GNSS antenna and at least 5 cm away therefrom.

3. A GNSS surveying station according to claim 1, wherein the second radio antenna is configured for receiving and/or emitting radio signal waves with GNSS correction information in each of the frequency bands of 850 MHz, 900 MHz, 1800 MHz and 1900 MHz.

4. A GNSS surveying station according to claim 1, wherein the second radio antenna is configured for receiving and/or emitting radio signal waves with GNSS correction information in each of the frequency bands of 850MHz, 900 MHz, 915 MHz, 1800 MHz and 1900 MHz, 2100 MHz and 2400 MHz.

5. A GNSS surveying station according to claim 1, wherein the first radio antenna and the GNSS antenna are arranged concentrically.

6. A GNSS surveying station according to claim 1, wherein the first radio antenna substantially encompasses the GNSS antenna in the circumferential direction.

7. A GNSS surveying station according to claim 1, wherein the first radio antenna substantially encompasses the GNSS antenna in the circumferential direction, wherein the first radio antenna is cylindrical and has an omnidirectional radiation characteristic.

8. A GNSS surveying station according to claim 1, wherein the first radio antenna is separated from the GNSS antenna.

9. A GNSS surveying station according to claim 1, wherein the first radio antenna is separated from the GNSS antenna by a cylindrical insulating filler material and is at the most 3 cm radially away from the circumference of the GNSS antenna.

10. A GNS S surveying station according to claim 1, wherein the first radio antenna is separated from the GNSS antenna by a cylindrical insulating filler material and is at the most 2 cm radially away from the circumference of the GNSS antenna.

11. A GNSS surveying station according to claim 1, wherein the first radio antenna is a wire loop antenna.

12. A GNSS surveying station according to claim 1, wherein the first radio antenna has a two-dimensional antenna geometry comprising conductive material which is applied to a nonconductive carrier material.

13. A GNSS surveying station according to claim 12, wherein the carrier material is includes plastic tape.

14. A GNSS surveying station according to claim 12, wherein the carrier material is includes plastic tape comprising polyimide material.

15. A GNSS surveying station according to claim 12, wherein the first antenna geometry has at least one dipole antenna and/or at least one monopole antenna.

16. A GNSS surveying station according to claim 1, wherein the GNSS antenna and the first radio antenna are arranged at the top in the housing and the second radio antenna is arranged at the bottom in the housing.

17. A GNSS surveying station according to claim 1, wherein the housing of the GNSS station includes:
    a first and a second battery compartment for respectively holding an energy store;
    the supply circuits of the two battery compartments are configured in such a way that the GNSS station can be operated either only with an energy store used in the first battery compartment or with an energy store used only in the second battery compartment.

18. A GNSS surveying station according to claim 1, wherein the housing of the GNSS station includes:
    a first and a second battery compartment for respectively holding a battery or accumulator;
    the supply circuits of the two battery compartments being configured in such a way that the GNSS station can be operated either only with an energy store used in the first battery compartment or with an energy store used only in the second battery compartment.

19. A GNSS surveying station according to claim 1, wherein the housing has a holder for a connectable radio module with signal interfaces to the first and to the second radio antenna and to an arithmetic unit integrated in the housing, the arithmetic unit being configured for deriving highly precise position information for the GNSS surveying station from the GNSS satellite signals and the GNSS correction data.

20. A GNSS surveying station according to claim 1, wherein the housing has a holder for a connectable radio module with signal interfaces to the first and to the second radio antenna and to an arithmetic unit integrated in the housing, the arithmetic unit being configured for deriving highly precise position information for the GNSS surveying station from the GNSS satellite signals and the GNSS correction data, the arithmetic unit being integrated in the GNSS satellite receiver.

21. A GNSS surveying station according to claim 19, further comprising:

a radio module which can be connected to the housing and has signal interfaces to the first or to the second radio antenna and to the GNSS satellite receiver, the radio module being configured for receiving and/or emitting GNSS correction data and for transmitting the GNSS correction data to the GNSS satellite receiver.

22. A GNSS surveying station according to claim 1, further comprising:

a surveyor's pole holder on the housing; and a surveyor's pole which is formed for a detachable fastening to the housing and has a length of at least about 1.50 meters or can be extended to at least this length.

23. A GNSS surveying station according to claim 1, wherein the planar GNSS antenna is disc shaped.

* * * * *